(12) United States Patent
Kozak

(10) Patent No.: US 6,481,694 B2
(45) Date of Patent: Nov. 19, 2002

(54) UTILITY CART WITH REMOVABLE VERTICAL LIFT DEVICE

(76) Inventor: David A. Kozak, 120 W. 8th St., Pennsburg, PA (US) 18073

( * ) Notice: Subject to any disclaimer, the term of this patent is extended or adjusted under 35 U.S.C. 154(b) by 0 days.

(21) Appl. No.: 09/812,398

(22) Filed: Mar. 20, 2001

(65) Prior Publication Data

US 2002/0134973 A1 Sep. 26, 2002

(51) Int. Cl.[7] .................................................. B66D 1/36
(52) U.S. Cl. ........................ 254/325; 254/334; 414/490; 280/47.26; 280/47.29
(58) Field of Search ................................. 254/323, 324, 254/325, 329, 334, 380; 414/490; 180/7.5; 248/333

(56) References Cited

U.S. PATENT DOCUMENTS

| | | | | |
|---|---|---|---|---|
| 1,887,965 A | * | 11/1932 | Stoner | 254/323 |
| 1,978,999 A | * | 10/1934 | Jones | 254/334 |
| 2,573,604 A | * | 10/1951 | Richardson et al. | 254/323 |
| D184,343 S | * | 2/1959 | Durbin et al. | 254/323 |
| 3,450,386 A | * | 6/1969 | Eliel | 254/323 |
| 3,913,762 A | * | 10/1975 | Alexander | 414/490 |
| 4,052,080 A | * | 10/1977 | Hedderich et al. | 280/47.26 |
| 4,435,115 A | * | 3/1984 | Orstad et al. | 414/490 |
| 4,632,627 A | * | 12/1986 | Swallows | 414/490 |
| 4,729,711 A | * | 3/1988 | Holopainen | 414/454 |
| 4,737,065 A | * | 4/1988 | Ju | 414/490 |
| 5,070,678 A | * | 12/1991 | Morrill | 414/490 |
| 5,251,922 A | * | 10/1993 | Mann | 280/47.29 |
| 5,294,136 A | * | 3/1994 | Dick et al. | 254/323 |
| 5,772,183 A | * | 6/1998 | Sears | 254/324 |
| 5,876,019 A | * | 3/1999 | Morrissey, Jr. et al. | 254/323 |
| 5,975,826 A | * | 11/1999 | Scholder | 414/444 |
| 6,138,991 A | * | 10/2000 | Myers, Jr. | 254/323 |
| 6,202,868 B1 | * | 3/2001 | Murray | 254/325 |

* cited by examiner

*Primary Examiner*—Emmanuel Marcelo
(74) *Attorney, Agent, or Firm*—Ratner Prestia

(57) ABSTRACT

A combined utility cart and lifting device, the cart having a tongue adapted to receive an elongated rod containing a winch and cable. The cart can be placed to position the rod and winch in a vertical position enabling a cable on the winch to move vertically to act as a lifting device.

6 Claims, 7 Drawing Sheets

UTILITY CART WITH REMOVABLE VERTICAL LIFT DEVICE

BACKGROUND OF THE INVENTION

The present invention pertains utility carts and in particular utility carts that would be used by workers setting up large tents for garden parties, wedding receptions and the like.

Large tents are used for outdoor functions to protect attendees at such functions from the sun, or in the case of inclement weather. Such tents are usually very large and require, in addition to the material itself, tent poles, side poles, ropes, tent stakes and the like. It is also common for the person putting up the tent to supply tables, chairs and other accessories for use inside the tent for the purposes of the function to be carried out inside the tent. All the material for the tent and the fixtures inside the tent must generally be carted from a truck to the location where the tent is being erected. Persons in this business usually have utility carts for transfer of the tent and related equipment. Such carts can be moved by a motor vehicle or by hand depending upon the size of the cart.

Most large tents are of the type that have a canopy or roof that is supported along a ridge or a longitudinal axis by tent poles. The roof extends outwardly from the tent poles to side poles, which support the peripheral edges of the tent above the ground at a convenient height. Side curtains can be attached to the roof of the tent at the peripheral edge to enclose the tent leaving only one or more entrances and exits to the tent as is well known in the art.

SUMMARY OF THE INVENTION

The present invention combines a utility cart for moving equipment such as that used by persons who erect tents with a vertical lifting device to enable the user to employ the cart to help lift the sides of the tents, once the main tent poles have been erected.

Therefore, the present invention is a combined trailerable cart and lifting device comprising: a generally rectangular frame having a front and back end; a tongue on the front end of the frame, the tongue adapted to receive and support one of a hitch mechanism or an elongated structural member; a generally rectangular, the support member removably positioned on a top side of the back end of the frame, said rectangular support having a width proximate the width of the frame and a length proximate one-half as long as the frame; an axle fixed to an underside of the frame, the axle supporting a pair of wheels to facilitate movement of the cart; and a removable vertical support having a first end adapted to be held by the tongue, the support including a cable assembly with a lifting hook, the hook and cable adapted to perform as a lifting device when the cart is positioned so that the tongue is in a vertical position.

DETAILED DESCRIPTION OF THE INVENTION

Figure 1:
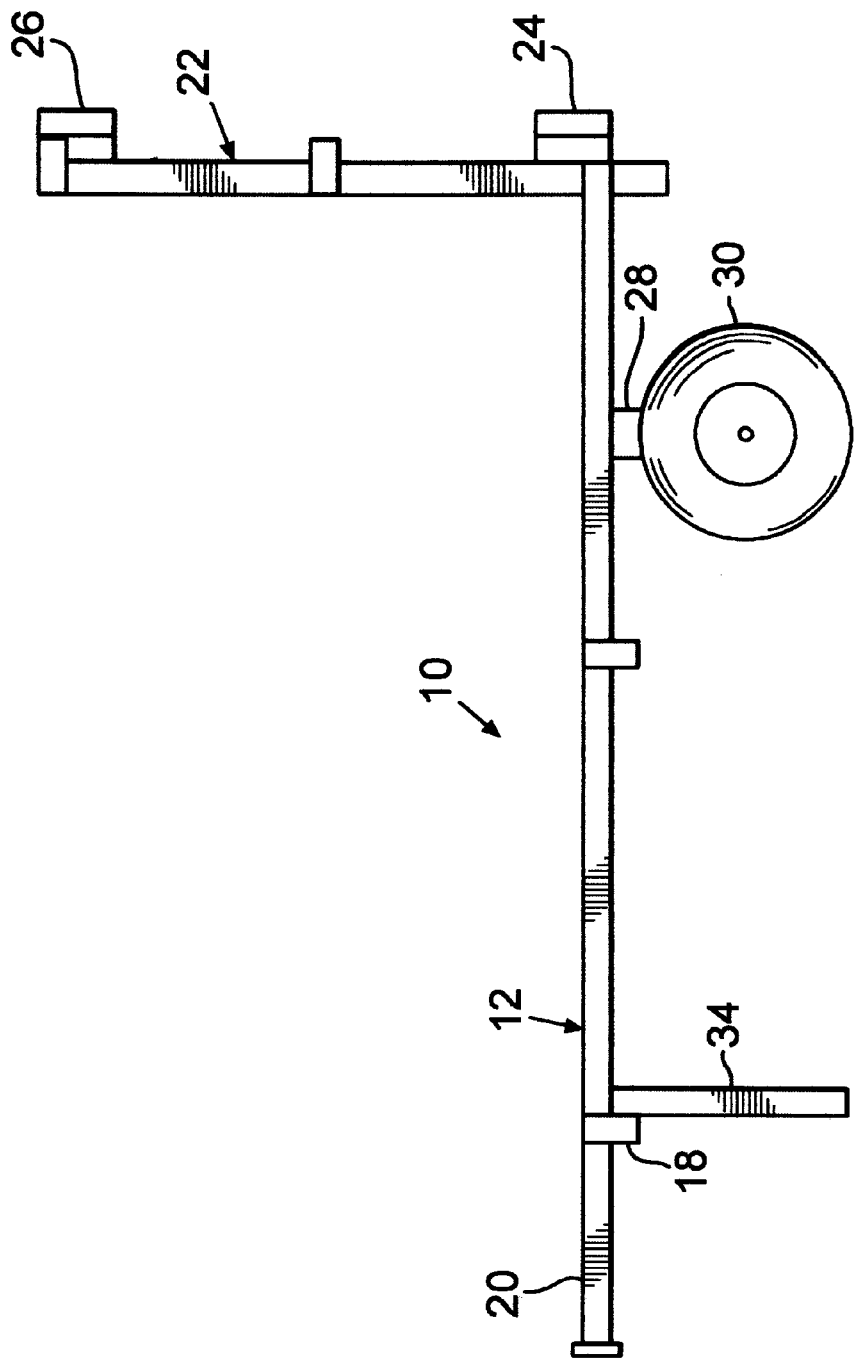
FIG. 1 is a side elevational view of a cart according to the present invention.
Figure 2:
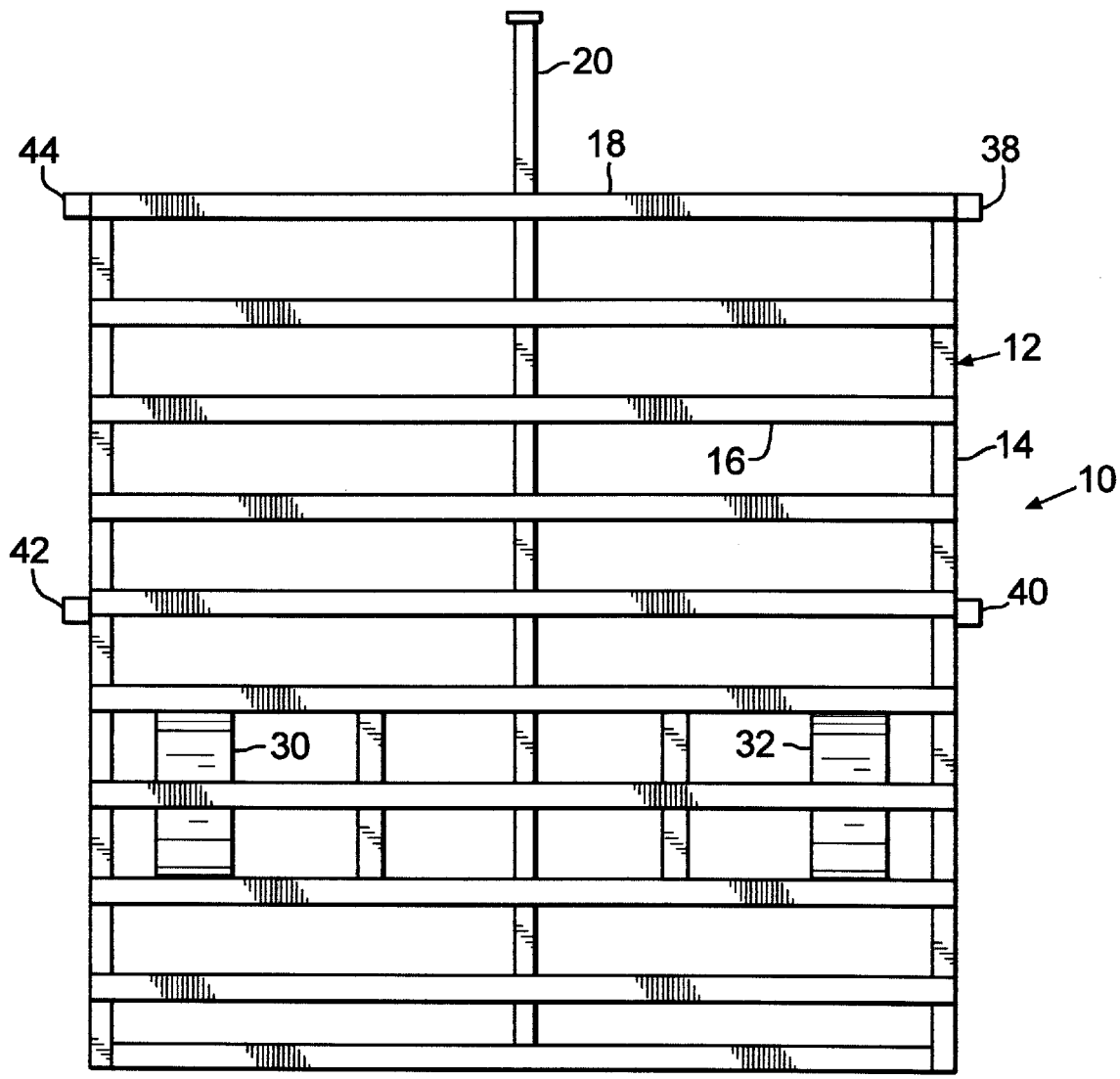
FIG. 2 is a top plan view of the cart of FIG. 1.

Referring to FIGS. 1 and 2, the cart 10 has a generally rectangular frame portion 12, which can be fabricated from a plurality of structural members 14, 16 fixed perpendicular to each other in the general shape of a rectangle. The structural members 14 and 16 can be tubular or solid depending upon the size of the cart and the loading of the cart during use. Cart 10 has a front end 18, from which projects a tongue 20, which may be part of a tubular member that extends the full length of the frame 12, as shown in FIG. 2. As shown in FIG. 1, cart 10 contains a vertical back member 22, which can also be formed of tubular members in an open work such as the frame 12. Such construction is well known in the art. Back 22 includes ground supports 24 and 26. Cart 10 can include suitable supports such as 28 which in turn support an axle (not shown), which in turn support wheels 30, 32 so that the cart can be moved readily by being coupled to a vehicle, or by hand with a suitable handle mounted in tongue 20. Vertical ground supports, (shown as 34 in FIG. 1), can be included proximate either side of the frame 12 to enable the cart 10 to be held generally horizontally for loading prior to moving. The ground supports 34 can be pivotally mounted so that they can be moved out of the way during movement of the cart. Such ground support mechanisms for use on utility carts is well known in the art.

Cart 10 can also include support members 38, 40, 42 and 44 to enable removable sides to be placed on the cart if so desired. Such removable side devices are well known in for use with utility carts.

Figure 3:
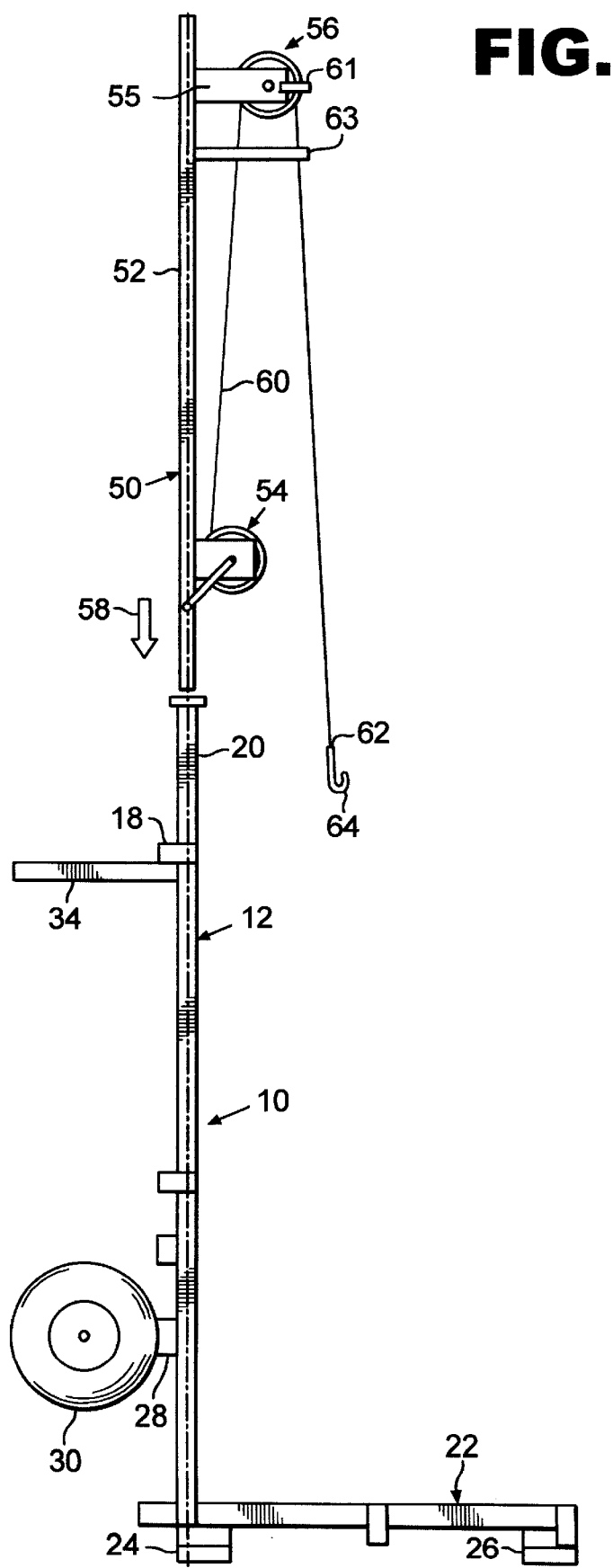
FIG. 3 is a side elevational view of the cart of FIG. 1 positioned vertically with the removable lifting mechanism positioned for placement in the tongue.

FIG. 3 shows the cart 10 tipped so that the back 22 becomes a ground support and the tongue 20 is positioned vertically. A lifting mechanism 50 consisting of a vertical support 52, a hand operated winch 54 and cable pulley assembly 56 can be removably mounted in the tongue 20 by insertion into the tongue as shown by arrow 58. A cable 60 is fastened to the drum of the winch 54 extends over the pulley assembly 56 and has a free end 62 containing a lifting device such as a hook 64.

Figure 4:
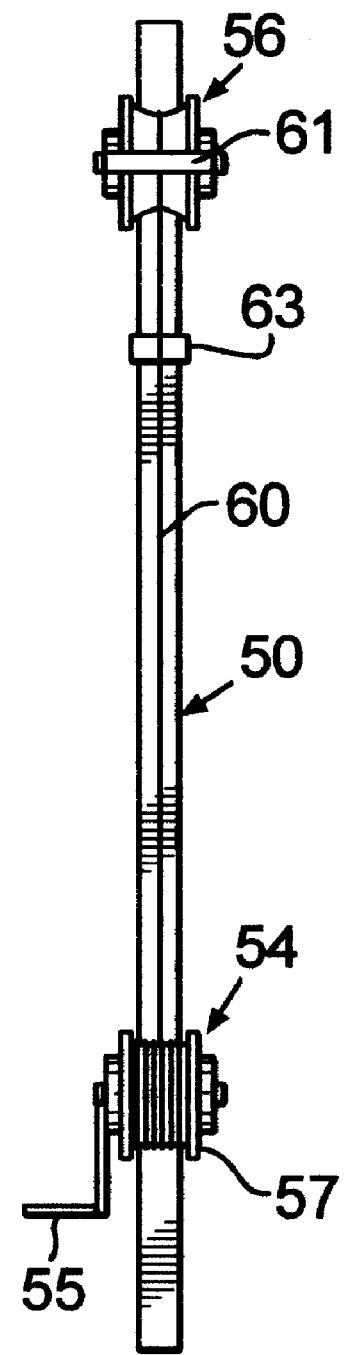
FIG. 4 is a front view of the removable lifting mechanism of FIG. 3.

FIG. 4 shows the lifting assembly 50 with the winch 54, having a hand crank 55 connected to a winding drum 57. The cable 60 extends over the pulley assembly 56, which is supported on an upper end of the cable assembly 50 as shown in FIG. 3, by a bracket 55. Cable assembly 56 can include a first guide 61 and a second guide 63 to make sure that the cable does not move laterally. It is within the scope of the invention to use a motor driven winch in place of the hand operated winch 59 shown in the drawings.

Figure 5:
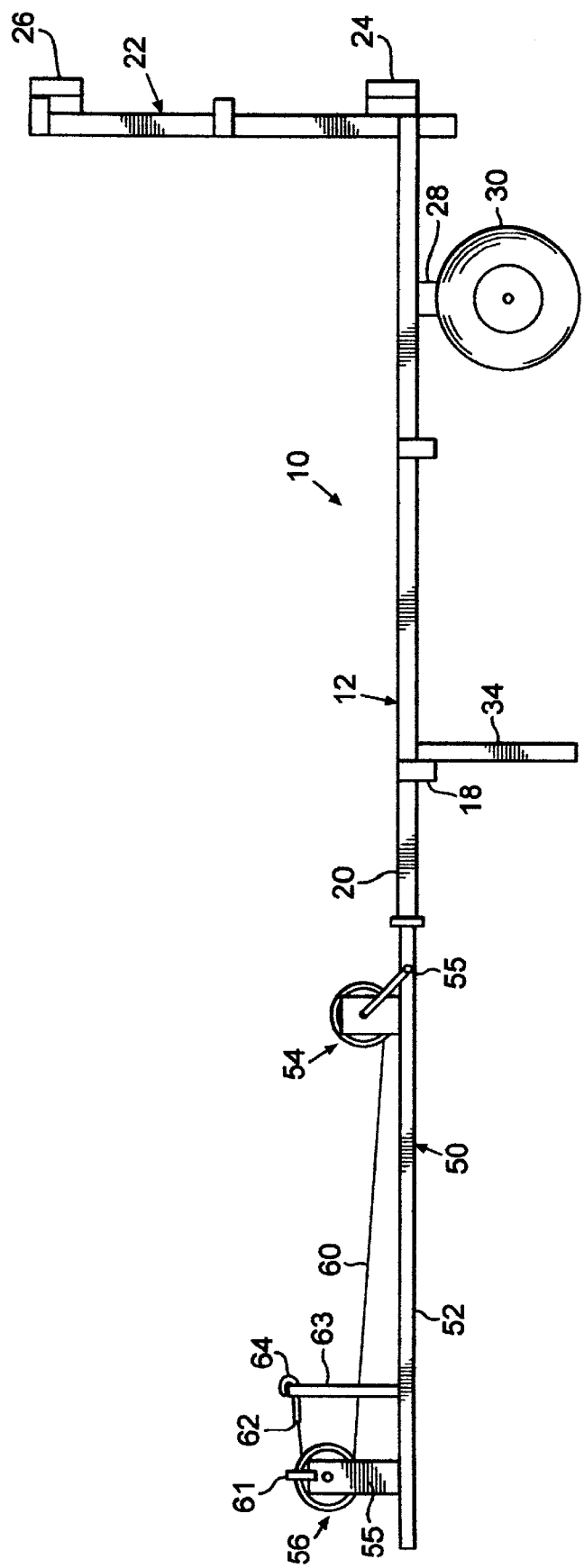
FIG. 5 is a side elevational view of the cart and lifting mechanism ready for use in raising a portion of the peripheral edge of a tent canopy.

FIG. 5 shows the cart in a horizontal position with the cable having the hook 64 fastened to the cable guide 63 so that the lifting mechanism can be conveniently moved from one position to another.

Figure 6:
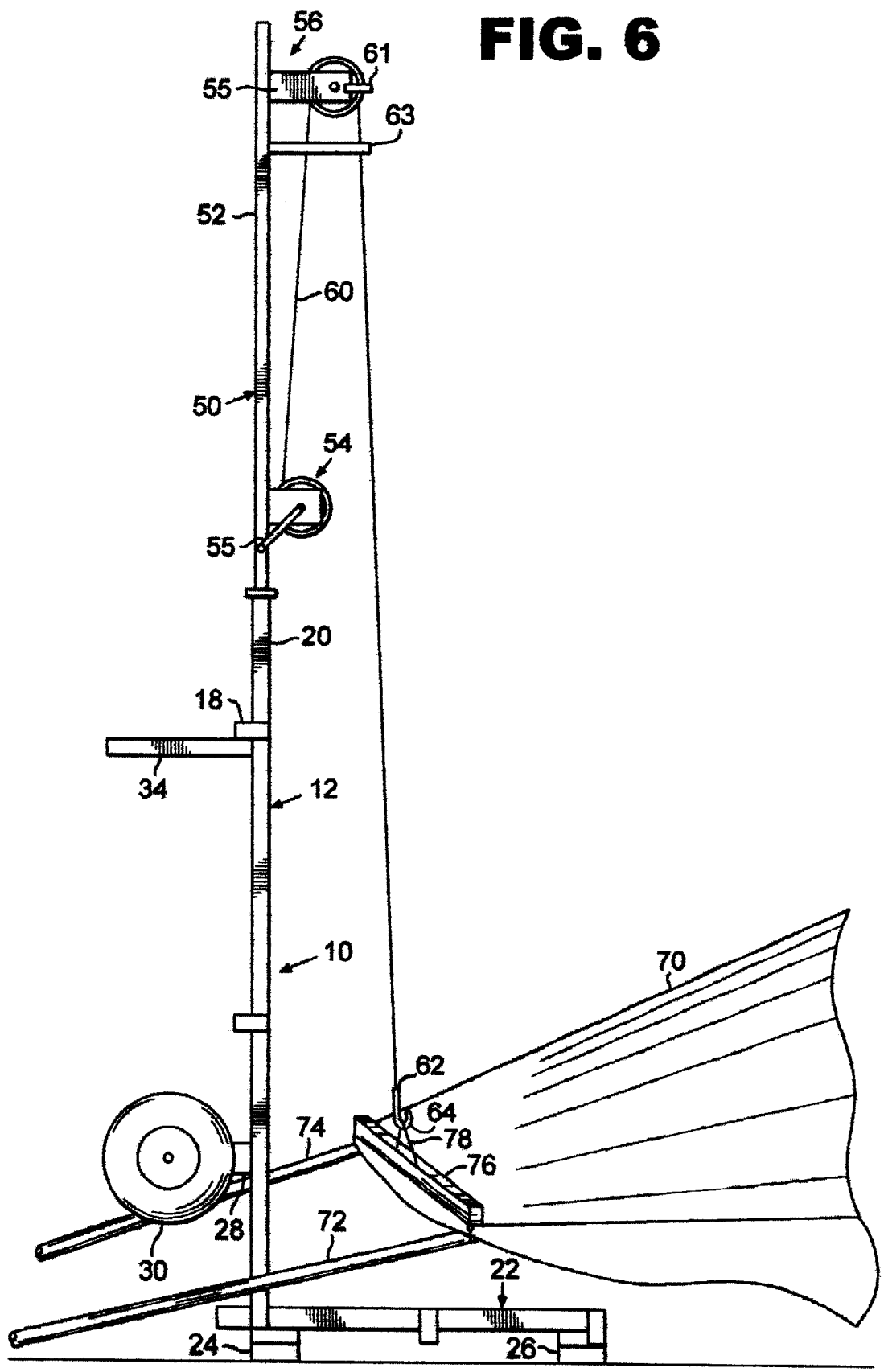
FIG. 6 is a side elevational view partially in perspective showing the cart and lifting mechanism in a first position for raising the peripheral edge of the tent canopy.
Figure 7:
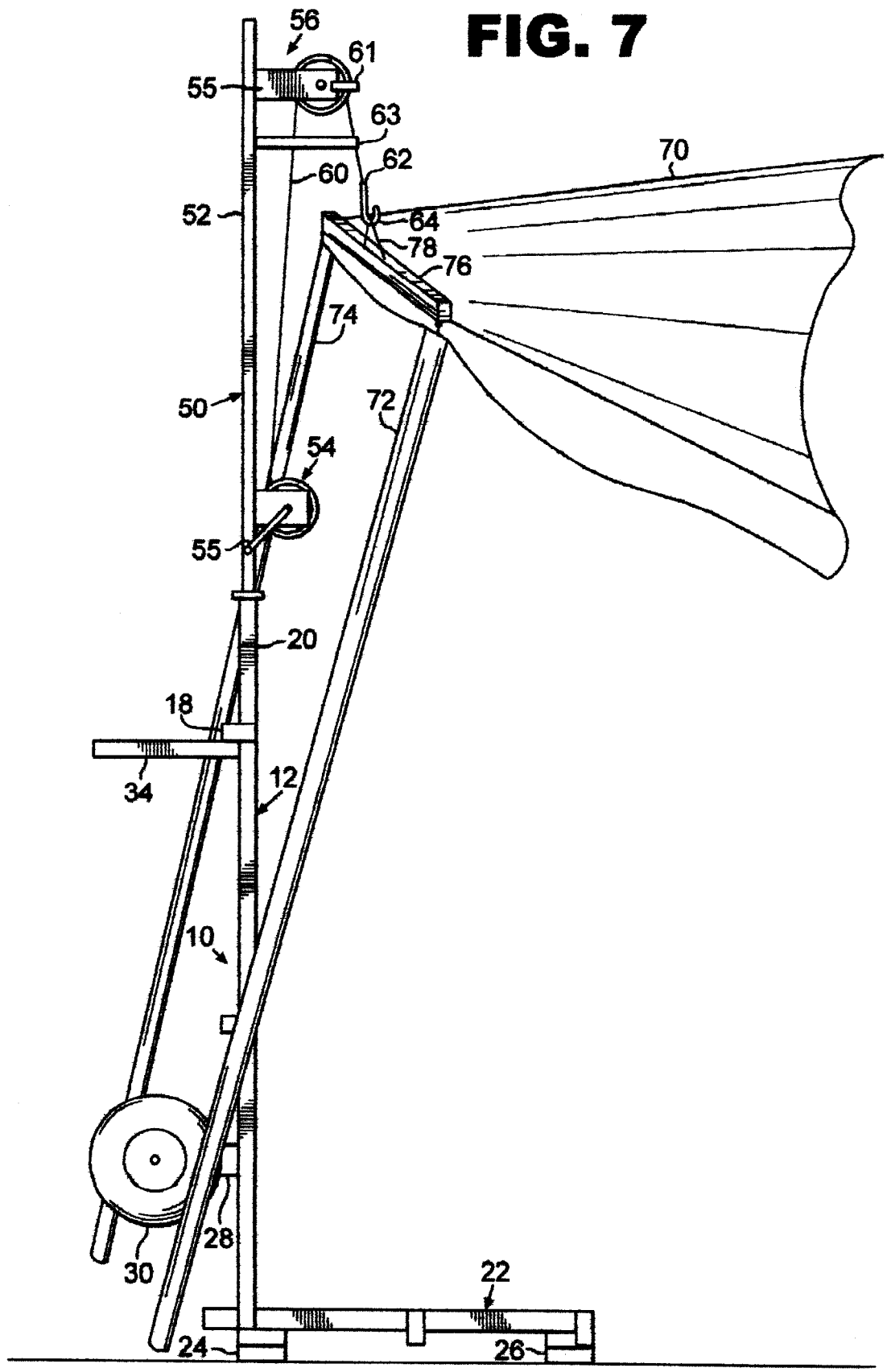
FIG. 7 is a partially perspective side elevational view showing the lifting mechanism in a second position for raising the peripheral edge of the tent canopy.

FIGS. 6 and 7 illustrate use of the apparatus of the invention to lift the peripheral edge of a tent 70 to an elevated position so that it can be supported by supports or side poles 72, 74. The edge of the tent 70 is fastened to a lifting member 76, which extends between adjacent holes in the edge of the tent (not shown) that receive the tent ends of the support poles 72, 74.

There are various methods for positioning the side poles to support the tent or the tent roof. One method is to have apertures in the edge of the tent which are closed by structural grommets spaced around the peripheral edge of the tent. The tent support poles will have a pin or rod on an upper end, which would slip into the aperture in the tent. Once the pole is positioned vertically, a support rope would be fastened from the portion of the support pole protruding through the edge of the tent to a side stake positioned in the ground as is well known in the art.

Referring back to FIGS. 6 and 7 the lifting mechanism 76 can be adapted to grasp the side poles 72, 74 projecting through the tent material 30. The lifting device 76 can have a lifting rope or cable 78, which is adapted to be lifted by the hook 64 as is shown in the drawing. When the tent is lying on the ground as shown in FIG. 6, and the cable is hooked as shown, the operator (user) then turns the crank handle 55 to wind the cable onto the drum and raise the tent to the position shown in FIG. 7. When the tent is in the position shown in FIG. 7, the side poles 72, 74 are moved into vertical alignment and the side poles can be fastened with supporting ropes as is well known in the art.

A cart according to the invention can have various structural configurations and accessories to carry the tent materials or other equipment, the form shown in the drawing and described herein being illustrative only.

The salient feature of the present invention is the ability of the cart to perform as a cart, but then to perform as a vertical lifting device with a portion of the cart being the support for the vertical lifting device.

Having thus described my invention as desired secured by Letters Patent of the United States is set forth in the appended claims.

What is claimed:

1. A combined trailerable cart and lifting device comprising:

a generally rectangular frame having a front end and a back end;

a tongue on said front end of said frame, said tongue adapted to removeably receive and support one of a hitch mechanism and an elongated structural member;

a generally rectangular support member removably positioned on a top side of said back end of said frame, said rectangular support having a width proximate the width of said frame and a length proximate one-half as long as said frame, whereby when said frame is rotated 90° to the horizontal said rectangular support member maintains said frame in a vertical position;

an axle fixed to an underside of said frame said axle supporting a pair of wheels and pneumatic tires to facilitate movement of said cart by one of a motor vehicle and human exertion; and a removable elongated structural member having a first end adapted to be held by said tongue, said elongated structural member including a cable assembly with a lifting hook, said hook moveable between said generally rectangular support member and a second end of said elongated structural member when said support is held in said tongue.

2. A cart assembly according to claim 1, including support means on said underside of said frame to act with said wheels to support said frame of said cart generally parallel to a horizontal surface when said cart is at rest.

3. A cart assembly according to claim 1, wherein said cable assembly includes a winch positioned on said elongated structural member proximate said first end of said elongated structural member and a pulley mounted proximate said second end of said elongated structural member together with a cable having one end fixed to a winding drum of said winch and a free end extending over said pulley with a lifting device on said free end of said cable.

4. A cart assembly according to claim 3, wherein said lifting device is one of a hook, snap hook, cable eye, and flexible bit end of said cable.

5. A cart assembly according to claim 1, including handle means adapted to be removably fastened to said tongue to permit manual movement of said cart.

6. A cart assembly according to claim 1, including removable front and side enclosing panels.

* * * * *